United States Patent
Shahana

(10) Patent No.: US 11,661,138 B2
(45) Date of Patent: May 30, 2023

(54) DRIVE TRAIN AND SPROCKET ARRANGEMENT FOR HUMAN-POWERED VEHICLE

(71) Applicant: SHIMANO INC., Sakai (JP)

(72) Inventor: Satoshi Shahana, Sakai (JP)

(73) Assignee: SHIMANO INC., Sakai (JP)

( * ) Notice: Subject to any disclaimer, the term of this patent is extended or adjusted under 35 U.S.C. 154(b) by 194 days.

(21) Appl. No.: 16/241,913

(22) Filed: Jan. 7, 2019

(65) Prior Publication Data
US 2020/0216143 A1 Jul. 9, 2020

(51) Int. Cl.
| | |
|---|---|
| *B62M 9/10* | (2006.01) |
| *B62M 9/126* | (2010.01) |
| *B62M 9/122* | (2010.01) |
| *B62M 9/136* | (2010.01) |
| *F16H 55/30* | (2006.01) |
| *B62M 9/132* | (2010.01) |
| *B62M 9/00* | (2006.01) |

(52) U.S. Cl.
CPC ............ *B62M 9/105* (2013.01); *B62M 9/122* (2013.01); *B62M 9/126* (2013.01); *B62M 9/132* (2013.01); *B62M 9/136* (2013.01); *F16H 55/30* (2013.01); *B62M 2009/002* (2013.01)

(58) Field of Classification Search
CPC ........... F16H 55/30; B62M 9/10; B62M 6/40; B62M 1/36; B62M 9/12; B62M 9/06; B62M 9/105; B62M 9/122; B62M 9/126; B62M 9/132

USPC .................................................. 474/160, 78
See application file for complete search history.

(56) References Cited

U.S. PATENT DOCUMENTS

| | | | | |
|---|---|---|---|---|
| 3,748,916 | A * | 7/1973 | Morse ................... | B62M 9/126 474/82 |
| 5,378,201 | A * | 1/1995 | Lee ......................... | B62M 9/131 474/77 |
| 5,486,015 | A * | 1/1996 | Lau ......................... | B62K 3/005 280/236 |
| 5,667,233 | A * | 9/1997 | Metzinger .............. | B62L 1/00 280/212 |
| 6,012,538 | A * | 1/2000 | Sonobe ................... | B62M 6/45 180/206.3 |
| 6,296,072 | B1 * | 10/2001 | Turner .................... | B62K 19/48 180/65.6 |

(Continued)

FOREIGN PATENT DOCUMENTS

| | | |
|---|---|---|
| CN | 206988378 U | 2/2018 |
| DE | 10 2012 204 452 | 9/2013 |

(Continued)

*Primary Examiner* — Henry Y Liu
(74) *Attorney, Agent, or Firm* — Mori & Ward, LLP

(57) ABSTRACT

A drive train for a human-powered vehicle comprises a drive unit, a sprocket arrangement, and a total gear range quotient. The drive unit includes a motor configured to impart propulsion to the human-powered vehicle. The sprocket arrangement is operatively coupled to the drive unit. The sprocket arrangement comprises a plurality of rear sprockets and a plurality of gear ratios respectively corresponding to the plurality of rear sprockets. The plurality of gear ratios includes a largest gear ratio and a smallest gear ratio. The total gear range quotient is obtained by dividing the largest gear ratio by the smallest gear ratio. The total gear range quotient is larger than 5.

14 Claims, 9 Drawing Sheets

(56) References Cited

U.S. PATENT DOCUMENTS

| | | | | |
|---|---|---|---|---|
| 6,767,308 B2* | 7/2004 | Kitamura | ............... | B62K 25/04 180/220 |
| 7,525,204 B2* | 4/2009 | Kitamura | ................. | B62J 6/01 290/1 R |
| 7,744,498 B2* | 6/2010 | Matsumoto | ............ | B62M 9/121 474/80 |
| 7,749,121 B2* | 7/2010 | Perng | ................... | B62M 6/55 475/5 |
| 8,777,804 B2* | 7/2014 | Takachi | ............... | B60W 20/10 477/3 |
| 8,794,368 B2* | 8/2014 | Gu | ........................... | B62M 6/55 180/206.4 |
| 8,972,086 B2* | 3/2015 | Komatsu | ................ | B60L 50/20 701/22 |
| 9,272,751 B2* | 3/2016 | Searles | ................. | F16M 13/022 |
| 9,758,212 B2* | 9/2017 | Kimmich | ............ | B62M 11/145 |
| 9,758,213 B2* | 9/2017 | Kawakami | ............ | B62M 6/55 |
| 9,789,927 B2* | 10/2017 | Tsuchizawa | ........... | B62M 25/08 |
| 10,035,561 B2* | 7/2018 | Spaggiari | ............ | B62M 11/145 |
| 10,703,433 B2* | 7/2020 | Lauer | ...................... | B62K 25/26 |
| 10,773,771 B2* | 9/2020 | Kimmich | ............ | B62M 6/55 |
| 10,919,602 B2* | 2/2021 | Chi-Hsueh | .............. | B62M 6/45 |
| 2002/0014366 A1* | 2/2002 | Turner | .................. | B62K 19/40 180/220 |
| 2005/0176537 A1* | 8/2005 | Matsumoto | ............ | B62M 9/121 474/80 |
| 2005/0285461 A1* | 12/2005 | Kitamura | ............. | H02K 7/1846 310/67 A |
| 2007/0254758 A1* | 11/2007 | Chen | .................... | B60B 27/047 474/160 |
| 2011/0303471 A1* | 12/2011 | Urabe | ..................... | B62M 6/65 180/65.51 |
| 2012/0309572 A1* | 12/2012 | Braedt | ..................... | B62M 9/10 474/160 |
| 2013/0054065 A1* | 2/2013 | Komatsu | ................ | B62K 23/02 701/22 |
| 2013/0241175 A1* | 9/2013 | Talavasek | ................ | B62M 6/60 280/288.4 |
| 2013/0267376 A1* | 10/2013 | Takachi | ................. | B62M 25/08 477/3 |
| 2014/0090500 A1* | 4/2014 | Schmitz | ................ | F16H 3/0915 74/335 |
| 2014/0128191 A1 | 5/2014 | Böhm | | |
| 2015/0080160 A1* | 3/2015 | Staples | .................... | B62M 9/12 474/160 |
| 2015/0183489 A1* | 7/2015 | Talavasek | .............. | B62K 23/02 180/207.3 |
| 2016/0083045 A1* | 3/2016 | Lin | ........................... | B62M 9/10 474/160 |
| 2016/0101826 A1* | 4/2016 | Watarai | .................... | B62M 6/55 180/206.4 |
| 2016/0167737 A1* | 6/2016 | Tokuyama | ............... | B62M 9/10 474/160 |
| 2016/0236750 A1* | 8/2016 | Emura | .................... | B62M 25/02 |
| 2016/0280326 A1* | 9/2016 | Braedt | .................... | F16H 55/30 |
| 2020/0198729 A1* | 6/2020 | Tsutsui | ................ | B62M 6/55 |

FOREIGN PATENT DOCUMENTS

| | | |
|---|---|---|
| DE | 10 2016 200 181 | 8/2016 |
| TW | 201628917 | 8/2016 |

* cited by examiner

|  | | | FS | |
|---|---|---|---|---|
|  | | | FS1 | FS2 |
|  | | | 28 | 38 |
| RS | RS1 | 63 | 0.44 | 0.60 |
| | RS2 | 50 | 0.56 | 0.76 |
| | RS3 | 40 | 0.70 | 0.95 |
| | RS4 | 32 | 0.88 | 1.19 |
| | RS5 | 26 | 1.08 | 1.46 |
| | RS6 | 21 | 1.33 | 1.81 |
| | RS7 | 17 | 1.65 | 2.24 |
| | RS8 | 14 | 2.00 | 2.71 |
| | RS9 | 11 | 2.55 | 3.45 |
| | RS10 | 9 | 3.11 | 4.22 |
| LARGEST GEAR RATIO | | | | 4.22 |
| SMALLEST GEAR RATIO | | | | 0.44 |
| TOTAL GEAR RANGE QUOTIENT | | | | 9.50 |
| TOTAL NUMBER OF INDIVIDUAL SPROCKET-SPACES | | | | 9 |
| FORCE-TRANSMISSION COEFFICIENT | | | | 1.06 |
| GEAR RANGE QUOTIENT | | | | 7 |

FIG. 4

|  | | FS | |
|---|---|---|---|
|  | | FS1 | FS2 |
|  | | 28 | 38 |
| RS | RS1 | 58 | 0.48 | 0.66 |
| | RS2 | 48 | 0.58 | 0.79 |
| | RS3 | 39 | 0.72 | 0.97 |
| | RS4 | 32 | 0.88 | 1.19 |
| | RS5 | 26 | 1.08 | 1.46 |
| | RS6 | 21 | 1.33 | 1.81 |
| | RS7 | 17 | 1.65 | 2.24 |
| | RS8 | 14 | 2.00 | 2.71 |
| | RS9 | 11 | 2.55 | 3.45 |
| | RS10 | 9 | 3.11 | 4.22 |

| | |
|---|---|
| LARGEST GEAR RATIO | 4.22 |
| SMALLEST GEAR RATIO | 0.48 |
| TOTAL GEAR RANGE QUOTIENT | 8.75 |
| TOTAL NUMBER OF INDIVIDUAL SPROCKET-SPACES | 9 |
| FORCE-TRANSMISSION COEFFICIENT | 0.97 |
| GEAR RANGE QUOTIENT | 6.44 |

FIG. 5

|   |   |   | FS | |
|---|---|---|---|---|
|   |   |   | FS1 | FS2 |
|   |   |   | 28 | 38 |
| RS | RS1 | 81 | 0.35 | 0.47 |
|   | RS2 | 62 | 0.45 | 0.61 |
|   | RS3 | 48 | 0.58 | 0.79 |
|   | RS4 | 37 | 0.76 | 1.03 |
|   | RS5 | 29 | 0.97 | 1.31 |
|   | RS6 | 23 | 1.22 | 1.65 |
|   | RS7 | 18 | 1.56 | 2.11 |
|   | RS8 | 14 | 2.00 | 2.71 |
|   | RS9 | 11 | 2.55 | 3.45 |
|   | RS10 | 9 | 3.11 | 4.22 |
| LARGEST GEAR RATIO | | | | 4.22 |
| SMALLEST GEAR RATIO | | | | 0.35 |
| TOTAL GEAR RANGE QUOTIENT | | | | 12.21 |
| TOTAL NUMBER OF INDIVIDUAL SPROCKET-SPACES | | | | 9 |
| FORCE-TRANSMISSION COEFFICIENT | | | | 1.36 |
| GEAR RANGE QUOTIENT | | | | 9 |

FIG. 6

|  | | 324(328) | |
|---|---|---|---|
|  | | GF1 | GF2 |
|  | | 1 | 1.35 |
| 324 (326) | GR1 | 0.44 | 0.44 | 0.59 |
| | GR2 | 0.56 | 0.56 | 0.76 |
| | GR3 | 0.7 | 0.70 | 0.95 |
| | GR4 | 0.88 | 0.88 | 1.19 |
| | GR5 | 1.08 | 1.08 | 1.46 |
| | GR6 | 1.33 | 1.33 | 1.80 |
| | GR7 | 1.65 | 1.65 | 2.23 |
| | GR8 | 2 | 2.00 | 2.70 |
| | GR9 | 2.55 | 2.55 | 3.44 |
| | GR10 | 3.11 | 3.11 | 4.20 |
| LARGEST GEAR RATIO | | | 4.20 |
| SMALLEST GEAR RATIO | | | 0.44 |
| TOTAL GEAR RANGE QUOTIENT | | | 9.54 |

FIG. 9

DRIVE TRAIN AND SPROCKET ARRANGEMENT FOR HUMAN-POWERED VEHICLE

BACKGROUND OF THE INVENTION

Field of the Invention

The present invention relates to a drive train and a sprocket arrangement for a human-powered vehicle.

Discussion of the Background

For example, a human-powered vehicle includes a drive train to transmit a human power to a wheel.

SUMMARY OF THE INVENTION

In accordance with a first aspect of the present invention, a drive train for a human-powered vehicle comprises a drive unit, a sprocket arrangement, and a total gear range quotient. The drive unit includes a motor configured to impart propulsion to the human-powered vehicle. The sprocket arrangement is operatively coupled to the drive unit. The sprocket arrangement comprises a plurality of rear sprockets and a plurality of gear ratios respectively corresponding to the plurality of rear sprockets. The plurality of gear ratios includes a largest gear ratio and a smallest gear ratio. The total gear range quotient is obtained by dividing the largest gear ratio by the smallest gear ratio. The total gear range quotient is larger than 5.

With the drive train according to the first aspect, it is possible to provide a wide gear range and a well-balanced combination of the plurality of sprockets in the drive train including the drive unit.

In accordance with a second aspect of the present invention, the drive train according to the first aspect is configured so that the total gear range quotient is equal to or larger than 7.

With the drive train according to the second aspect, it is possible to effectively provide a wide gear range and a well-balanced combination of the plurality of sprockets in the drive train including the drive unit.

In accordance with a third aspect of the present invention, the drive train according to the first or second aspect is configured so that the total gear range quotient is equal to or larger than 9.

With the drive train according to the third aspect, it is possible to effectively provide a wide gear range and a well-balanced combination of the plurality of sprockets in the drive train including the drive unit.

In accordance with a fourth aspect of the present invention, the drive train according to any one of the first to third aspects further comprises a rear derailleur configured to shift a chain relative to the plurality of rear sprockets.

With the drive train according to the fourth aspect, it is possible to change a gear position in the plurality of rear sprockets.

In accordance with a fifth aspect of the present invention, the drive train according to the fourth aspect further comprises a front derailleur.

With the drive train according to the fifth aspect, it is possible to change a gear position in a plurality of front sprockets.

In accordance with a sixth aspect of the present invention, the drive train according to any one of the first to fifth aspects further comprises at least one internal transmission device.

With the drive train according to the sixth aspect, it is possible to effectively provide a wide gear range and a well-balanced combination of the plurality of sprockets in the drive train including the drive unit.

In accordance with a seventh aspect of the present invention, the drive train according to the sixth aspect is configured so that the at least one internal transmission device includes a rear internal transmission device configured to be disposed on a rear wheel.

With the drive train according to the seventh aspect, it is possible to effectively provide a wide gear range and a well-balanced combination of the plurality of sprockets in the drive train including the drive unit.

In accordance with an eighth aspect of the present invention, the drive train according to the sixth or seventh aspect is configured so that the at least one internal transmission device includes a front internal transmission device configured to be coupled to a crank assembly.

With the drive train according to the eighth aspect, it is possible to effectively provide a wide gear range and a well-balanced combination of the plurality of sprockets in the drive train including the drive unit.

In accordance with a ninth aspect of the present invention, the drive train according to any one of the first to eighth aspects is configured so that a total number of the plurality of rear sprockets is equal to or smaller than 10.

With the drive train according to the ninth aspect, it is possible to effectively provide a wide gear range and a well-balanced combination of the plurality of sprockets in the drive train including the drive unit.

In accordance with a tenth aspect of the present invention, the drive train according to the ninth aspect is configured so that the total number of the plurality of rear sprockets is equal to or larger than 5.

With the drive train according to the tenth aspect, it is possible to effectively provide a wide gear range and a well-balanced combination of the plurality of sprockets in the drive train including the drive unit.

In accordance with an eleventh aspect of the present invention, the drive train according to any one of the first to tenth aspects is configured so that the sprocket arrangement includes at least one individual sprocket-space provided between two adjacent rear sprockets among the plurality of rear sprockets. The two adjacent rear sprockets are adjacent to each other without another rear sprocket therebetween in an axial direction with respect to a rotational center axis of the plurality of rear sprockets. A force-transmission coefficient obtained by dividing the total gear range quotient by a total number of the at least one individual sprocket-space is equal to or smaller than 1.

With the drive train according to the eleventh aspect, it is possible to effectively provide a wide gear range and a well-balanced combination of the plurality of sprockets in the drive train including the drive unit.

In accordance with a twelfth aspect of the present invention, the drive train according to any one of the first to tenth aspects is configured so that the sprocket arrangement includes at least one individual sprocket-space provided between two adjacent rear sprockets among the plurality of rear sprockets. The two adjacent rear sprockets are adjacent to each other without another rear sprocket therebetween in an axial direction with respect to a rotational center axis of the plurality of rear sprockets. A force-transmission coefficient obtained by dividing the total gear range quotient by a total number of the at least one individual sprocket-space is larger than 1.

With the drive train according to the twelfth aspect, it is possible to effectively provide a wide gear range and a well-balanced combination of the plurality of sprockets in the drive train including the drive unit.

In accordance with a thirteenth aspect of the present invention, a sprocket arrangement for a human-powered vehicle comprises a plurality of rear sprockets and a gear range quotient. The plurality of rear sprockets includes a largest rear sprocket and a smallest rear sprocket. The gear range quotient is obtained by dividing a total tooth-number of the largest rear sprocket by a total tooth-number of the smallest rear sprocket. The gear range quotient is larger than 6.01.

With the sprocket arrangement according to the thirteenth aspect, it is possible to provide a wide gear range and a well-balanced combination of the plurality of sprockets in the sprocket arrangement.

In accordance with a fourteenth aspect of the present invention, the sprocket arrangement according to the thirteenth aspect is configured so that a total number of the plurality of rear sprockets is equal to or smaller than 10.

With the sprocket arrangement according to the fourteenth aspect, it is possible to effectively provide a wide gear range and a well-balanced combination of the plurality of sprockets in the sprocket arrangement.

In accordance with a fifteenth aspect of the present invention, the sprocket arrangement according to the fourteenth aspect is configured so that the total number of the plurality of rear sprockets is equal to or larger than 5.

With the sprocket arrangement according to the fifteenth aspect, it is possible to effectively provide a wide gear range and a well-balanced combination of the plurality of sprockets in the sprocket arrangement.

In accordance with a sixteenth aspect of the present invention, the sprocket arrangement according to any one of the thirteenth to fifteenth aspects is configured so that the gear range quotient is equal to or larger than 7.

With the sprocket arrangement according to the sixteenth aspect, it is possible to effectively provide a wide gear range and a well-balanced combination of the plurality of sprockets in the sprocket arrangement.

In accordance with a seventeenth aspect of the present invention, the sprocket arrangement according to any one of the thirteenth to sixteenth aspects is configured so that the gear range quotient is equal to or larger than 9.

With the sprocket arrangement according to the seventeenth aspect, it is possible to effectively provide a wide gear range and a well-balanced combination of the plurality of sprockets in the sprocket arrangement.

In accordance with an eighteenth aspect of the present invention, the sprocket arrangement according to any one of the thirteenth to seventeenth aspects is configured so that the sprocket arrangement includes at least one individual sprocket-space provided between two adjacent rear sprockets among the plurality of rear sprockets. The two adjacent rear sprockets are adjacent to each other without another rear sprocket therebetween in an axial direction with respect to a rotational center axis of the plurality of rear sprockets. A force-transmission coefficient obtained by dividing the total gear range quotient by a total number of the at least one individual sprocket-space is equal to or smaller than 1.

With the sprocket arrangement according to the eighteenth aspect, it is possible to effectively provide a wide gear range and a well-balanced combination of the plurality of sprockets in the sprocket arrangement.

In accordance with a nineteenth aspect of the present invention, the sprocket arrangement according to any one of the thirteenth to seventeenth aspects is configured so that the sprocket arrangement includes at least one individual sprocket-space provided between two adjacent rear sprockets among the plurality of rear sprockets. The two adjacent rear sprockets are adjacent to each other without another rear sprocket therebetween in an axial direction with respect to a rotational center axis of the plurality of rear sprockets. A force-transmission coefficient obtained by dividing the total gear range quotient by a total number of the at least one individual sprocket-space is equal to or larger than 1.

With the sprocket arrangement according to the nineteenth aspect, it is possible to effectively provide a wide gear range and a well-balanced combination of the plurality of sprockets in the sprocket arrangement.

In accordance with a twentieth aspect of the present invention, a drive train for a human-powered vehicle comprises at least one internal transmission device and a total gear range quotient. The at least one internal transmission device has a plurality of gear ratios. The plurality of gear ratios includes a largest gear ratio and a smallest gear ratio. The total gear range quotient is obtained by dividing the largest gear ratio by the smallest gear ratio. The total gear range quotient is equal to or larger than 6.37.

With the drive train according to the twentieth aspect, it is possible to provide the drive train having a wide gear range and a well-balanced combination of the plurality of sprockets.

In accordance with a twenty-first aspect of the present invention, the drive train according to the twentieth aspect is configured so that the at least one internal transmission device includes a rear internal transmission device configured to be disposed on a rear wheel.

With the drive train according to the twenty-first aspect, it is possible to provide the drive train having a wide gear range and a well-balanced combination of the plurality of sprockets.

In accordance with a twenty-second aspect of the present invention, the drive train according to the twentieth or twenty-first aspect is configured so that the at least one internal transmission device includes a front internal transmission device configured to be coupled to a crank assembly.

With the drive train according to the twenty-second aspect, it is possible to provide the drive train having a wide gear range and a well-balanced combination of the plurality of sprockets.

In accordance with a twenty-third aspect of the present invention, a drive train for a human-powered vehicle comprises a plurality of gear ratios and a total gear range quotient. The plurality of gear ratios includes a largest gear ratio and a smallest gear ratio. The total gear range quotient is obtained by dividing the largest gear ratio by the smallest gear ratio. The total gear range quotient is equal to or larger than 6.95.

With the drive train according to the twenty-third aspect, it is possible to provide the drive train having a wide gear range and a well-balanced combination of the plurality of sprockets.

In accordance with a twenty-fourth aspect of the present invention, the drive train according to the twenty-third aspect is configured so that the total gear range quotient is equal to or larger than 9.

With the drive train according to the twenty-fourth aspect, it is possible to provide the drive train having a wide gear range and a well-balanced combination of the plurality of sprockets.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 4 is a table showing a plurality of gear ratios of the drive train illustrated in FIG. 2.

FIG. 5 is a table showing a plurality of gear ratios of a drive train in accordance with a modification of the first embodiment.

FIG. 6 is a table showing a plurality of gear ratios of a drive train in accordance with another modification of the first embodiment.

FIG. 9 is a table showing a plurality of gear ratios of the drive train illustrated in FIG. 8.

DESCRIPTION OF THE EMBODIMENTS

Figure 1:
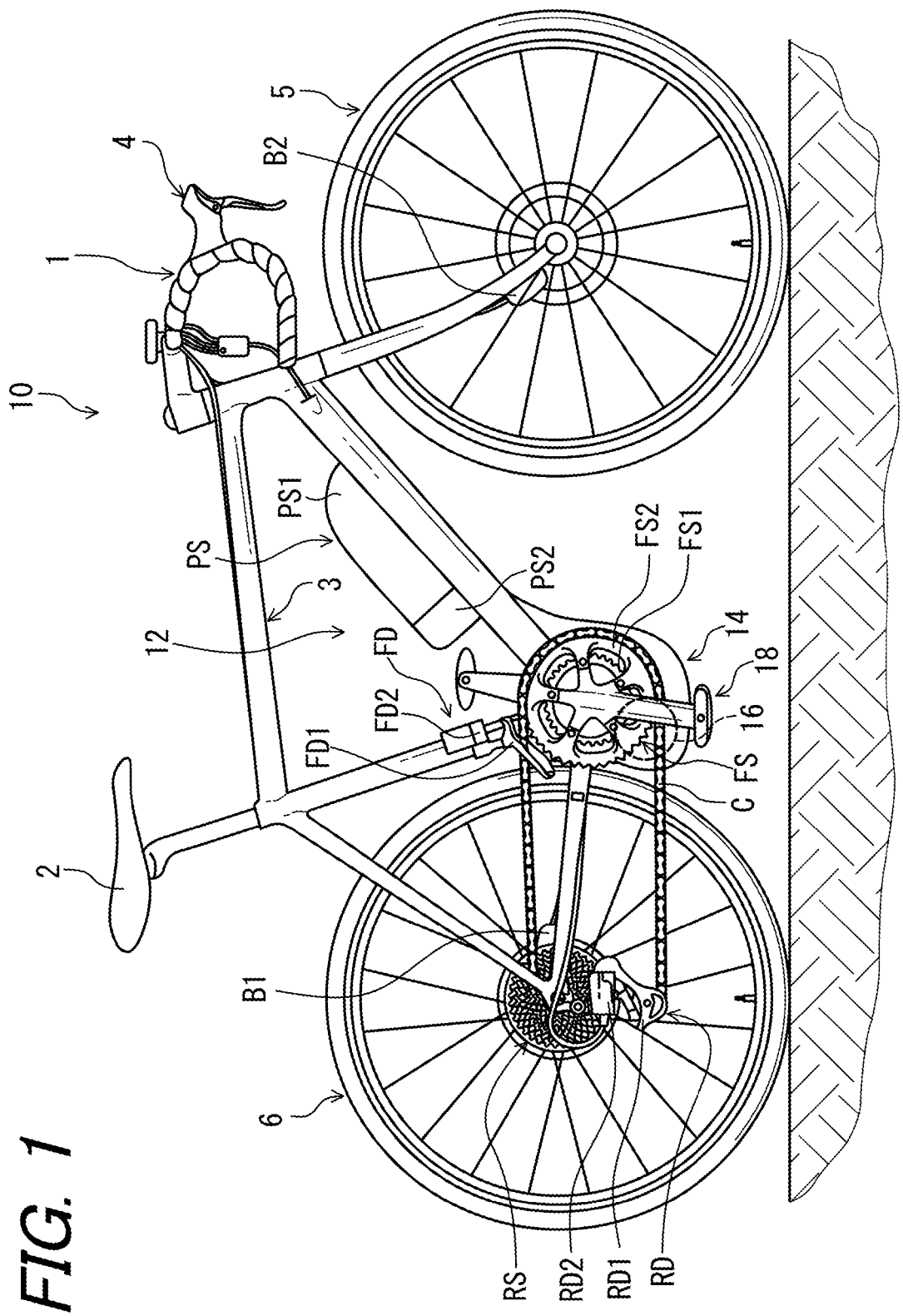
FIG. 1 is a side elevational view of a human-powered vehicle including a drive train in accordance with a first embodiment.

The embodiment(s) will now be described with reference to the accompanying drawings, wherein like reference numerals designate corresponding or identical elements throughout the various drawings.

First Embodiment

Referring initially to FIG. 1, a human-powered vehicle 10 includes a drive train 12 in accordance with an embodiment. For example, the human-powered vehicle 10 is a vehicle to travel with a motive power including at least a human power of a user who rides the human-powered vehicle 10. Examples of the user who rides the human-powered vehicle 10 include a rider. The human-powered vehicle 10 has an arbitrary number of wheels. For example, the human-powered vehicle 10 has at least one wheel. In this embodiment, the human-powered vehicle 10 preferably has a smaller size than that of a four-wheeled automobile. However, the human-powered vehicle 10 can have an arbitrary size. For example, the human-powered vehicle 10 can have a larger size than that of the four-wheeled automobile. Examples of the human-powered vehicle 10 include a bicycle, a tricycle, and a kick scooter. In this embodiment, the human-powered vehicle 10 is a bicycle. An electric assisting system including an electric motor can be applied to the human-powered vehicle 10 to assist muscular motive power of the user. Namely, the human-powered vehicle 10 can be an E-bike. While the human-powered vehicle 10 is illustrated as a road bike having a motor, the technology disclosed in the present application can be applied to mountain bikes or any type of human-powered vehicles 10.

As seen in FIG. 1, the human-powered vehicle 10 includes a handlebar 1, a saddle 2, a vehicle body 3, an operating device 4, a front wheel 5, and a rear wheel 6. The operating device 4 is mounted to the handlebar 1. The operating device 4 includes a rear brake operating device via which a user operates a rear braking device B1 and a front operating device via which a user operates a front braking device B2.

In the present application, the following directional terms "front," "rear," "forward," "rearward," "left," "right," "transverse," "upward" and "downward" as well as any other similar directional terms refer to those directions which are determined on the basis of a user who sits on the saddle 2 of the human-powered vehicle 10 with facing the handlebar 1. Accordingly, these terms, as utilized to describe components, should be interpreted relative to the human-powered vehicle 10 equipped with the components as used in an upright riding position on a horizontal surface.

Figure 2:
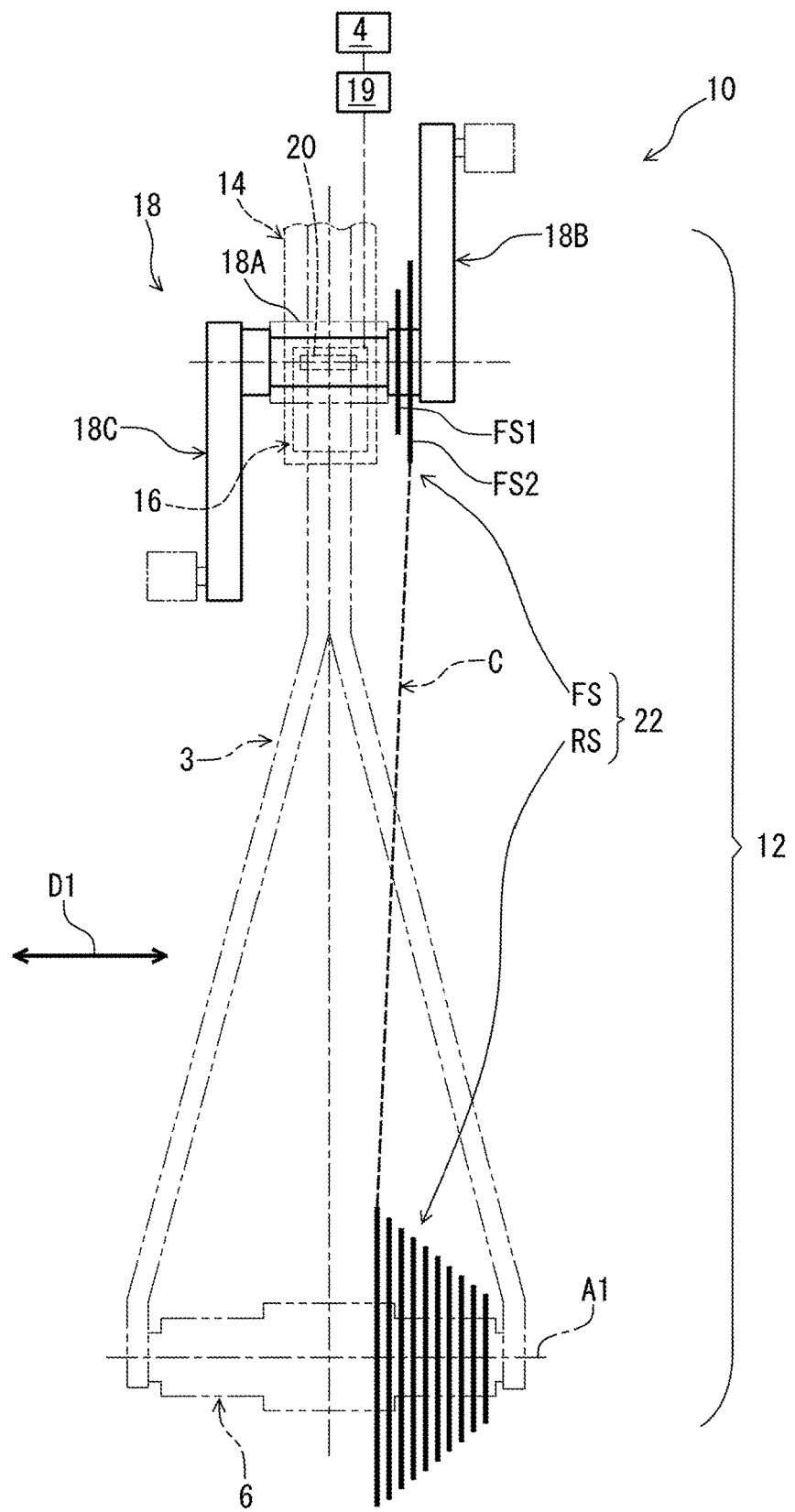
FIG. 2 is a schematic diagram of the drive train of the human-powered vehicle illustrated in FIG. 1.

As seen in FIG. 2, the drive train 12 for the human-powered vehicle 10 comprises a drive unit 14. The drive unit 14 includes a motor 16 configured to impart propulsion to the human-powered vehicle 10. The drive train 12 comprises a crank assembly 18 rotatably mounted to the vehicle frame 3. The crank assembly 18 includes a crank axle 18A and crank arms 18B and 18C. The crank arms 18B and 18C are secured to the crank axle 18A. For example, the drive unit 14 is configured to apply an assist rotational force to the crank assembly 18.

The drive unit 14 comprises a pedaling-force sensor 20 configured to sense a pedaling force applied to the crank assembly 18 from a rider. The drive unit 14 includes a motor controller 19 configured to control the motor 16 to add the assist rotational force to the drive train 12 in response to the pedaling force sensed by the pedaling-force sensor 20. However, the motor controller 19 is configured to control the motor 16 to add the rotational force to the drive train 12 regardless of the pedaling force. For example, the motor controller 19 is configured to control the motor 16 to add the rotational force to the drive train 12 in response to a user input received by the operating device 4.

The drive train 12 for the human-powered vehicle 10 comprises a sprocket arrangement 22. The sprocket arrangement 22 is operatively coupled to the drive unit 14. The sprocket arrangement 22 for the human-powered vehicle 10 comprises a plurality of rear sprockets RS. The sprocket arrangement 22 comprises a plurality of front sprockets FS mounted to the crank assembly 18. The drive train 12 comprises a chain C engaged with the plurality of front sprockets FS and the plurality of rear sprockets RS to transmit a rotational force from the plurality of front sprockets FS to the plurality of rear sprockets RS. In the present application, the "sprocket" indicates a member engageable with the chain C and does not include a gear provided in an internal transmission device.

As seen in FIG. 1, the drive train 12 further comprises a rear derailleur RD configured to shift the chain C relative to the plurality of rear sprockets RS. The drive train 12 further comprises a front derailleur FD configured to shift the chain C relative to the plurality of front sprockets FS. The rear derailleur RD is configured to shift the chain C among a plurality of rear gear positions respectively corresponding to the plurality of rear sprockets RS in response to a gear-shift operation which is input to the operating device 4. The front derailleur FD is configured to shift the chain C among a plurality of front gear positions respectively corresponding to the plurality of front sprockets FS in response to a gear-shift operation which is input to the operating device 4.

In this embodiment, the rear derailleur RD includes a chain guide RD1 and an electric actuator RD2 configured to move the chain guide RD1 in response to a user input received by the operating device 4. The front derailleur FD includes a chain guide FD1 and an electric actuator FD2 configured to move the chain guide FD1 in response to a user input received by the operating device 4. The rear derailleur RD is electrically connected to the operating device 4 with a wire communication or a wireless communication. The front derailleur FD is electrically connected to the operating device 4 or the rear derailleur RD with a wire communication or a wireless communication. However, the rear derailleur RD and/or the front derailleur FD can be operated with a mechanical cable.

The drive train 12 includes a power supply PS. The power supply PS is electrically connected to the operating device 4, the motor 16, the rear derailleur RD, and the front derailleur FD to supply electricity to the operating device 4, the motor 16, the rear derailleur RD, and the front derailleur FD. The power supply PS includes a battery PS1 and a battery holder PS2. Examples of the battery PS1 include a primary battery such as a lithium manganese dioxide battery, and a secondary battery such as a lithium-ion secondary battery. In this embodiment, the battery PS1 is the secondary battery. The battery PS1 is detachably attached to the battery holder PS2 to supply electricity to the gear shifting device RD, the additional gear shifting device FD, and other electric components. For example, the battery PS1 includes a plurality of battery cells. The battery holder PS2 is mounted to the vehicle body 3 (FIG. 1) and is electrically connected to the operating device 4, the motor 16, the gear shifting device RD, and the additional gear shifting device FD to supply electricity from the battery PS1 to the operating device 4, the motor 16, the rear derailleur RD, and the front derailleur FD to supply electricity to the operating device 4, the rear derailleur RD, and the front derailleur FD. The battery holder PS2 can be provided in the vehicle body 3 (FIG. 1). The drive train 12 can include another power supply configured to supply electricity to the rear derailleur RD and/or the front derailleur FD instead of or in addition to the power supply PS.

Figure 3:
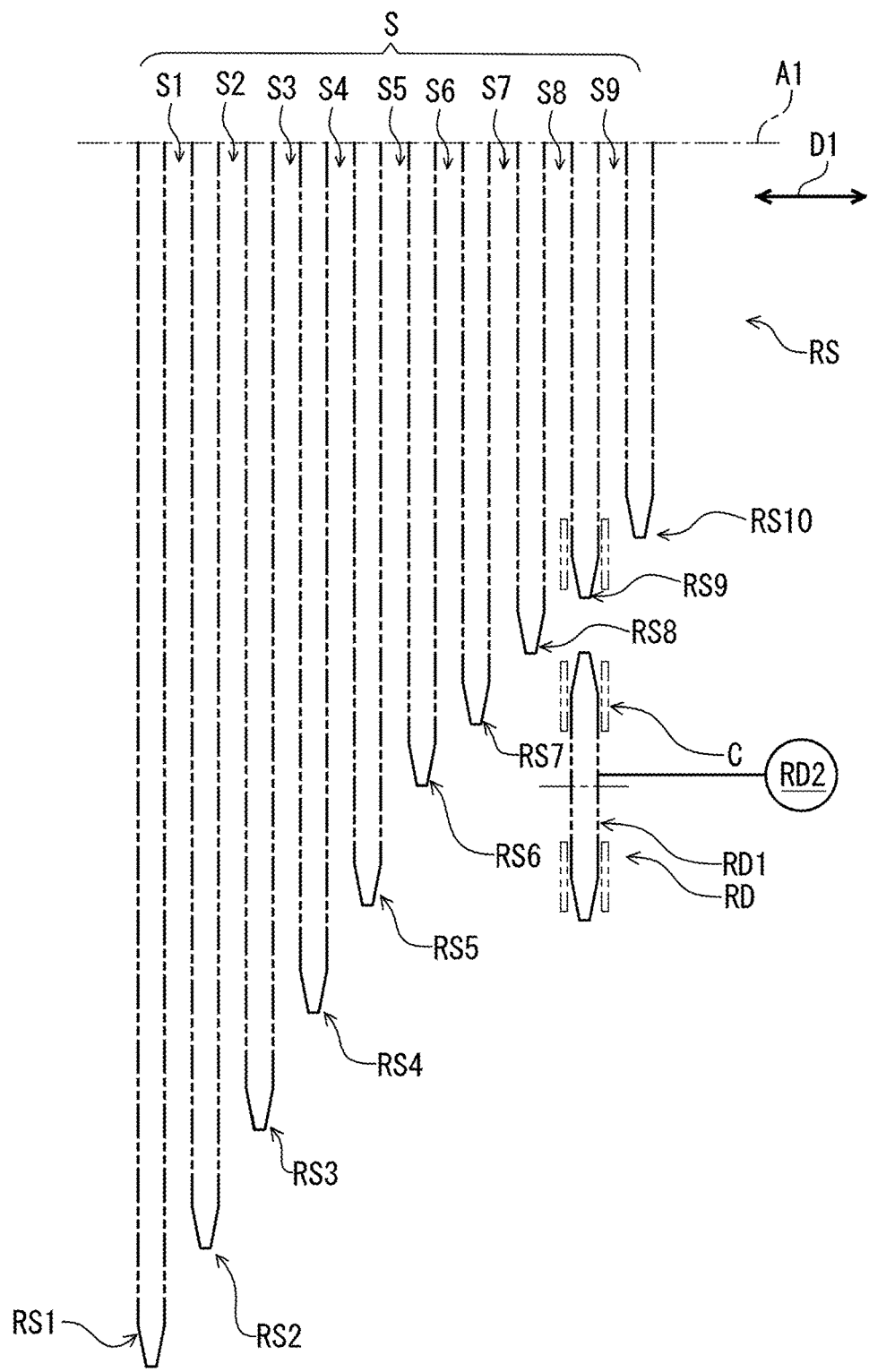
FIG. 3 is a schematic diagram of a plurality of rear sprockets of the drive train illustrated in FIG. 2.

As seen in FIG. 3, a total number of the plurality of rear sprockets RS is equal to or smaller than 10. The total number of the plurality of rear sprockets RS is equal to or larger than 5. In this embodiment, the total number of the plurality of rear sprockets RS is 10. The plurality of rear sprockets RS includes first to tenth rear sprockets RS1 to RS10. However, the total number of the plurality of rear sprockets RS is not limited to this embodiment.

The sprocket arrangement 22 includes at least one individual sprocket-space provided between two adjacent rear sprockets among the plurality of rear sprockets RS. The two adjacent rear sprockets RS are adjacent to each other without another rear sprocket therebetween in an axial direction D1 with respect to a rotational center axis A1 of the plurality of rear sprockets RS.

In this embodiment, the sprocket arrangement 22 includes a plurality of individual sprocket-spaces S provided between two adjacent rear sprockets among the plurality of rear sprockets RS. Specifically, the plurality of individual sprocket-spaces S includes first to ninth individual sprocket-spaces S1 to S9. A total number of the plurality of individual sprocket-spaces S is nine. However, the total number of the plurality of individual sprocket-spaces S is not limited to this embodiment.

As seen in FIG. 2, a total number of the plurality of front sprockets FS is equal to or smaller than two. In this embodiment, the total number of the plurality of front sprockets FS is two. The plurality of front sprockets FS includes first and second front sprockets FS1 and FS2. However, the total number of the plurality of front sprockets FS is not limited to this embodiment.

As seen in FIG. 4, the drive train 12 for the human-powered vehicle 10 comprises a plurality of gear ratios. In this embodiment, the sprocket arrangement 22 comprises a plurality of gear ratios. The plurality of gear ratios respectively corresponds to the plurality of rear sprockets RS. The plurality of gear ratios includes a largest gear ratio and a smallest gear ratio. In this embodiment, combinations of the plurality of rear sprockets RS and the plurality of front sprockets FS provide the plurality of gear ratios.

In this embodiment, a total number of sprocket teeth of the first rear sprocket RS1 is 63. A total number of sprocket teeth of the second rear sprocket RS2 is 50. A total number of sprocket teeth of the third rear sprocket RS3 is 40. A total number of sprocket teeth of the fourth rear sprocket RS4 is 32. A total number of sprocket teeth of the fifth rear sprocket RS5 is 26. A total number of sprocket teeth of the sixth rear sprocket RS6 is 21. A total number of sprocket teeth of the seventh rear sprocket RS7 is 17. A total number of sprocket teeth of the eighth rear sprocket RS 8 is 14. A total number of sprocket teeth of the ninth rear sprocket RS9 is 11. A total number of sprocket teeth of the tenth rear sprocket RS10 is 9. The total number of sprocket teeth can also be referred to as a total tooth-number. However, the total tooth-number of each of the plurality of rear sprockets RS is not limited to this embodiment.

A total number of sprocket teeth of the first front sprocket FS1 is 28. A total number of sprocket teeth of the second front sprocket FS2 is 38. However, the total tooth-number of each of the plurality of front sprockets FS is not limited to this embodiment.

The drive train 12 comprises a total gear range quotient obtained by dividing the largest gear ratio by the smallest gear ratio. The total gear range quotient is larger than 5. The total gear range quotient is equal to or larger than 6.95. The total gear range quotient is equal to or larger than 7. The total gear range quotient is equal to or larger than 9. The total gear range quotient is equal to or smaller than 11.

The largest gear ratio is obtained by dividing the largest total tooth-number in the plurality of front sprockets FS by the smallest total tooth-number in the plurality of rear sprockets RS. The smallest gear ratio is obtained by dividing the smallest total tooth-number in the plurality of front sprockets FS by the largest total tooth-number in the plurality of rear sprockets RS.

In this embodiment, the largest gear ratio is 4.22 if the total tooth-number of the second front sprocket FS2 is 38 and the total tooth-number of the tenth rear sprocket RS10 is 9. The smallest gear ratio is 0.44 if the total tooth-number of the first front sprocket FS1 is 28and the total tooth-number of the first rear sprocket RS1 is 63. The total gear range quotient is 9.5 if the largest gear ratio is 4.22 and the smallest gear ratio is 0.44. However, the total gear range quotient is not limited to this embodiment and the above ranges. The largest gear ratio and the smallest gear ratio are not limited to this embodiment.

The force-transmission coefficient obtained by dividing the total gear range quotient by the total number of the at least one individual sprocket-space is larger than 1. In this embodiment, the force-transmission coefficient is 1.06 if the total gear range quotient is 9.50 and the total number of the plurality of individual sprocket-spaces S is 9. However, the force-transmission coefficient is not limited to this embodiment and the above range. As seen in FIG. 5, for example, the force-transmission coefficient obtained by dividing the total gear range quotient by the total number of the at least one individual sprocket-space can be equal to or smaller than 1. In the modification of FIG. 5, the largest gear ratio is 4.22, the smallest gear ratio is 0.48, the total gear range quotient is 8.75, and the force-transmission coefficient is 0.97.

As seen in FIG. 3, the plurality of rear sprockets RS includes a largest rear sprocket and a smallest rear sprocket. In this embodiment, the largest rear sprocket is the first rear sprocket RS1. The smallest rear sprocket is the tenth rear sprocket RS10. As seen in FIG. 4, the sprocket arrangement 22 comprises a gear range quotient obtained by dividing a total tooth-number of the largest rear sprocket by a total tooth-number of the smallest rear sprocket. The gear range quotient is larger than 6.01. The gear range quotient is equal to or larger than 7. The gear range quotient is equal to or smaller than 11. In this embodiment, the total gear range quotient is 7 if the total tooth-number of the largest rear sprocket RS1 is 63 and the total tooth-number of the smallest rear sprocket RS10 is 9. However, the total gear range quotient is not limited to this embodiment. As seen in FIG. 6, for example, the gear range quotient can be equal to or larger than 9. In the modification of FIG. 6, the total tooth-number of the largest rear sprocket RS1 is 81, the total tooth-number of the smallest rear sprocket RS1 is 9, and the gear range quotient is 9.

Second Embodiment

A human-powered vehicle 210 including a drive train 212 in accordance with a second embodiment will be described below referring to FIG. 7. The drive train 212 has the same structure and/or configuration as those of the drive train 12 except for the internal transmission device. Thus, elements having substantially the same function as those in the first embodiment will be numbered the same here and will not be described and/or illustrated again in detail here for the sake of brevity.

Figure 7:
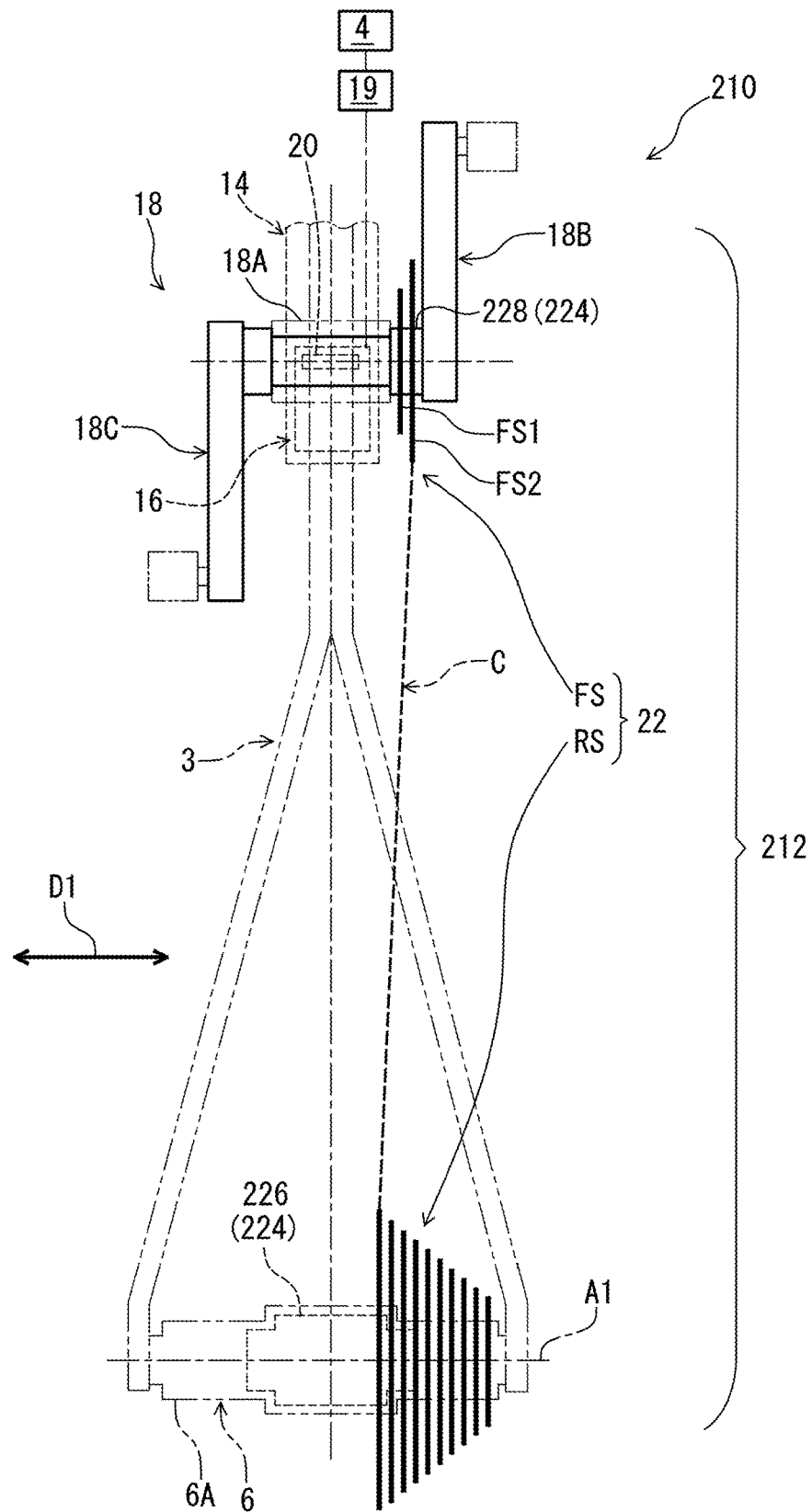
FIG. 7 is a schematic diagram of a drive train of a human-powered vehicle in accordance with a second embodiment.

As seen in FIG. 7, the drive train for the human-powered vehicle 210 comprises the drive unit 14 and the sprocket arrangement 22. In this embodiment, the drive train 212 further comprises at least one internal transmission device 224. The at least one internal transmission device 224 includes a rear internal transmission device 226 configured to be disposed on the rear wheel 6. The at least one internal transmission device 224 includes a front internal transmission device 228 configured to be coupled to the crank assembly 18.

For example, the rear internal transmission device 226 includes a planetary gear structure. The rear internal transmission device 226 has at least one gear ratio to increase a rotational speed of the rear wheel 6 relative to a rotational speed of the plurality of rear sprockets RS.

The front internal transmission device 228 is provided between the crank assembly 18 and the plurality of front sprockets FS. For example, the front internal transmission device 228 includes a planetary gear structure. The front internal transmission device 228 has at least one gear ratio to increase a rotational speed of the plurality of front sprockets FS relative to a rotational speed of the crank assembly 18.

In this embodiment, for example, the sprocket arrangement 22 has the same gear ratios as the gear ratios shown in FIG. 5 of the first embodiment. However, the sprocket arrangement 22 can have other gear ratios by utilizing the gear ratios of the at least one internal transmission device 224. At least one of the rear internal transmission device 226 and the front internal transmission device 228 can be omitted from the drive train 212.

Third Embodiment

A human-powered vehicle 310 including a drive train 312 in accordance with a third embodiment will be described below referring to FIGS. 8 and 9. The drive train 312 has the same structure and/or configuration as those of the drive train 12 except for the internal transmission device and the sprocket arrangement. Thus, elements having substantially the same function as those in the above embodiments will be numbered the same here and will not be described and/or illustrated again in detail here for the sake of brevity.

Figure 8:
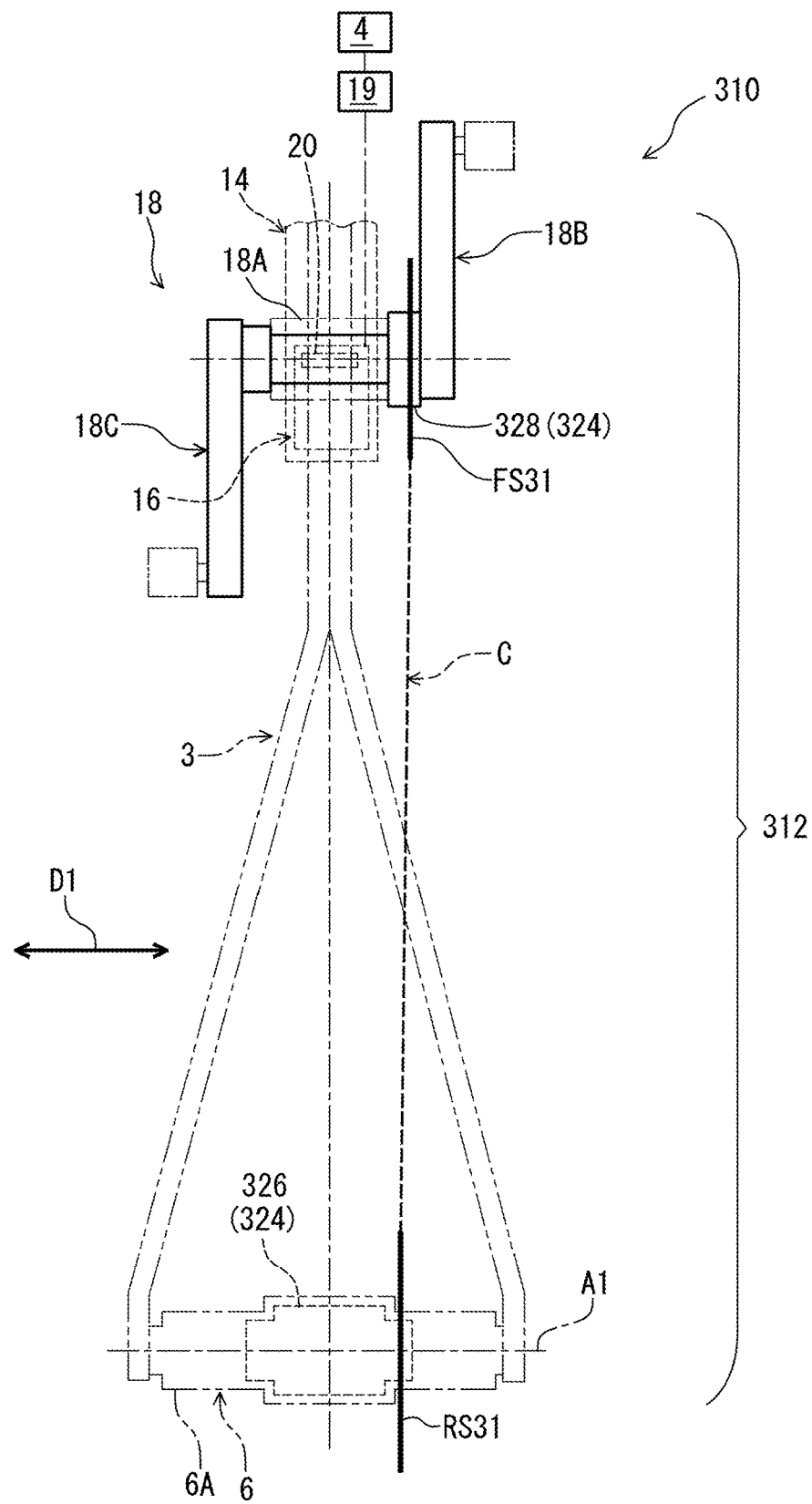
FIG. 8 is a schematic diagram of a drive train of a human-powered vehicle in accordance with a third embodiment.

As seen in FIG. 8, the drive train 312 for the human-powered vehicle 310 comprises at least one internal transmission device 324. In this embodiment, the sprocket arrangement 22 is omitted from the drive train 312. Instead, the drive train 312 comprises a front sprocket FS31 and a rear sprocket RS31. A total number of sprocket teeth of the front sprocket FS31 is equal to a total number of sprocket teeth of the rear sprocket FS32. The total number of sprocket teeth can also be referred to as a total tooth-number. However, the total tooth-number of the front sprocket FS31 can be different from the total tooth-number of the rear sprocket FS32.

In this embodiment, the at least one internal transmission device 324 includes a rear internal transmission device 326 configured to be disposed on the rear wheel 6. The at least one internal transmission device 324 includes a front internal transmission device 328 configured to be coupled to the crank assembly 18.

The rear internal transmission device 326 is provided between the rear sprockets RS31 and the hub assembly 6A of the rear wheel 6. For example, the rear internal transmission device 326 includes a planetary gear structure. The rear internal transmission device 326 has at least one gear ratio to increase a rotational speed of the rear wheel 6 relative to a rotational speed of the rear sprockets RS31.

The front internal transmission device 328 is provided between the crank assembly 18 and the front sprockets FS31. For example, the front internal transmission device 328 includes a planetary gear structure. The front internal transmission device 328 has at least one gear ratio to increase a rotational speed of the front sprocket FS31 relative to a rotational speed of the crank assembly 18.

As seen in FIG. 9, the at least one internal transmission device 324 has a plurality of gear ratios. The plurality of gear ratios includes a largest gear ratio and a smallest gear ratio. The drive train 212 comprises a total gear range quotient obtained by dividing the largest gear ratio by the smallest gear ratio. The total gear range quotient is equal to or larger than 6.37.

In this embodiment, the rear internal transmission device 326 has a plurality of rear gear ratios GR1 to GR10. The front internal transmission device 326 has a plurality of front gear ratios GF1 and GF2. The plurality of gear ratios of the drive train 312 is defined by the rear gear ratios GR1 to GR10 and the front gear ratios GF1 and GF2. The largest gear ratio is 4.20. The smallest gear ratio is 0.44.

The drive train 312 for the human-powered vehicle 310 comprises a plurality of gear ratios. The plurality of gear ratios includes a largest gear ratio and a smallest gear ratio. The drive train 312 for the human-powered vehicle 310 comprises a total gear range quotient obtained by dividing the largest gear ratio by the smallest gear ratio. The total gear range quotient is equal to or larger than 6.95. The total gear range quotient is equal to or larger than 9.

In this embodiment, the total gear range quotient is 9.54 if the largest gear ratio is 4.2 and the smallest gear ratio is 0.44. However, the largest gear ratio, the smallest gear ratio, and the total gear range quotient are not limited to this embodiment and the above ranges.

Other Modifications

In the above embodiments and the above modifications, the total number of the rear sprockets RS is 10, and the total number of the front sprockets FS is 2. However, the total number of the rear sprockets RS and the total number of the front sprockets FS are not limited to the above embodiments and the above modifications. The total number of the rear sprockets RS can be larger than 10. The total number of the front sprockets FS can be larger than 2. In such modifications, it is possible to reduce a difference between the total number of a rear sprocket and the total number of another rear sprocket adjacent to the rear sprocket. It is possible to reduce a difference between the total number of a front sprocket and the total number of another front sprocket adjacent to the front sprocket.

In the third embodiment, the drive train 312 can include a sprocket arrangement as well as the other embodiments and the modifications.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A drive train for a human-powered vehicle, comprising:
   a drive unit including a motor configured to impart propulsion to the human-powered vehicle;
   a sprocket arrangement operatively coupled to the drive unit, the sprocket arrangement comprising a first front sprocket, a plurality of rear sprockets and a plurality of gear ratios respectively corresponding to the plurality of rear sprockets, the plurality of gear ratios including a largest gear ratio and a smallest gear ratio;
   a total gear range quotient obtained by dividing the largest gear ratio by the smallest gear ratio, the total gear range quotient being equal to or larger than 7;
   the motor being provided adjacent to the first front sprocket;
   the sprocket arrangement including at least one individual sprocket-space provided between two adjacent rear sprockets among the plurality of rear sprockets;
   the two adjacent rear sprockets being adjacent to each other without another rear sprocket therebetween in an axial direction with respect to a rotational center axis of the plurality of rear sprockets; and
   a force-transmission coefficient obtained by dividing the total gear range quotient by a total number of the at least one individual sprocket-space being equal to or larger than 0.97 and being equal to or smaller than 1.36.

2. The drive train according to claim 1, wherein the total gear range quotient is equal to or larger than 9.

3. The drive train according to claim 1, further comprising:
   a rear derailleur configured to shift a chain relative to the plurality of rear sprockets.

4. The drive train according to claim 3, further comprising:
   a front derailleur.

5. The drive train according to claim 1, further comprising:
   at least one internal transmission device.

6. The drive train according to claim 5, wherein the at least one internal transmission device includes a rear internal transmission device configured to be disposed on a rear wheel.

7. The drive train according to claim 5, wherein the at least one internal transmission device includes a front internal transmission device configured to be coupled to a crank assembly.

8. The drive train according to claim 1, wherein a total number of the plurality of rear sprockets is equal to or smaller than 10.

9. The drive train according to claim 8, wherein the total number of the plurality of rear sprockets is equal to or larger than 5.

10. A drive train for a human-powered vehicle, comprising:

a drive unit including a motor configured to impart propulsion to the human-powered vehicle;

a first front sprocket, the motor being provided adjacent to the first front sprocket;

at least one internal transmission device having a plurality of gear ratios, the plurality of gear ratios including a largest gear ratio and a smallest gear ratio;

a total gear range quotient obtained by dividing the largest gear ratio by the smallest gear ratio, the total gear range quotient being equal to or larger than 6.37;

the sprocket arrangement including at least one individual sprocket-space provided between two adjacent rear sprockets among the plurality of rear sprockets;

the two adjacent rear sprockets being adjacent to each other without another rear sprocket therebetween in an axial direction with respect to a rotational center axis of the plurality of rear sprockets; and a force-transmission coefficient obtained by dividing the total gear range quotient by a total number of the at least one individual sprocket-space being equal to or larger than 0.97 and being equal to or smaller than 1.36.

11. The drive train according to claim 10, wherein the at least one internal transmission device includes a rear internal transmission device configured to be disposed on a rear wheel.

12. The drive train according to claim 11, wherein the at least one internal transmission device includes a front internal transmission device configured to be coupled to a crank assembly.

13. The drive train according to claim 1, the motor being configured to apply an assist rotational force to a crank assembly of the human-powered vehicle.

14. The drive train according to claim 10, the motor being configured to apply an assist rotational force to a crank assembly of the human-powered vehicle.

* * * * *